US007094961B2

(12) United States Patent
Ura et al.

(10) Patent No.: US 7,094,961 B2
(45) Date of Patent: Aug. 22, 2006

(54) MUSICAL INSTRUMENT CAPABLE OF DIAGNOSING ELECTRONIC AND MECHANICAL COMPONENTS AND DIAGNOSTIC SYSTEM USED THEREIN

(75) Inventors: Tomoyuki Ura, Hamamatsu (JP); Yasuhiko Ohba, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 11/169,077

(22) Filed: Jun. 27, 2005

(65) Prior Publication Data

US 2006/0027069 A1 Feb. 9, 2006

(30) Foreign Application Priority Data

Aug. 6, 2004 (JP) ............................ 2004-230959

(51) Int. Cl.
*G10H 1/00* (2006.01)
*G06F 11/00* (2006.01)

(52) U.S. Cl. .......................................... 84/600; 714/30

(58) Field of Classification Search .................... 84/13, 84/600; 714/30, 31
See application file for complete search history.

(56) References Cited

U.S. PATENT DOCUMENTS

| | | | | |
|---|---|---|---|---|
| 4,970,928 A | | 11/1990 | Tamaki | |
| 5,210,367 A | | 5/1993 | Taguchi et al. | |
| 5,600,521 A | * | 2/1997 | Kondo | 361/18 |
| 5,908,997 A | | 6/1999 | Arnold et al. | |
| 6,160,213 A | * | 12/2000 | Arnold et al. | 84/615 |

FOREIGN PATENT DOCUMENTS

| | | | | |
|---|---|---|---|---|
| EP | 0044609 | A2 | | 1/1982 |
| EP | 44609 | A2 | * | 1/1982 |
| JP | 2830709 | B2 | | 9/1998 |

* cited by examiner

*Primary Examiner*—Jeffrey W Donels
(74) *Attorney, Agent, or Firm*—Morrison & Foerster LLP

(57) ABSTRACT

An automatic player piano includes an acoustic piano and an electronic system for reenacting a performance on the acoustic piano; a self-diagnosis subroutine program runs on a microprocessor of the electronic system so as to diagnose solenoid-operated actuators with built-in plunger sensors and component parts of the acoustic piano such as keys, pedals, action units and hammers on the basis of pieces of plunger data, pieces of key data and pieces of hammer data; thus, the mechanical components of the piano are diagnosed as well as the electric components through the execution of the self-diagnosis subroutine program.

20 Claims, 9 Drawing Sheets

Task of Diagnosing Linkage, Pedal Units and Cooperation

MUSICAL INSTRUMENT CAPABLE OF DIAGNOSING ELECTRONIC AND MECHANICAL COMPONENTS AND DIAGNOSTIC SYSTEM USED THEREIN

FIELD OF THE INVENTION

This invention relates to a musical instrument and, more particularly, to a musical instrument having a self-diagnostic system for the components incorporated in a musical instrument.

DESCRIPTION OF THE RELATED ART

There are various musical instruments assisted with computer systems. An electronic keyboard is a typical example of the computer-assisted musical instrument, and another example is a hybrid musical instrument, i.e., the combination between an acoustic musical instrument and an electronic system. The information processing unit, which is constituted by at least a microprocessor, a program memory, a working memory and a bus system, is the main system component of the electronic system, and supervises various system components.

If the system components were free from failures, any diagnostic system would not be required for the electronic system of the musical instrument. However, failures are unavoidable. In this situation, the manufacturers try to install a self-diagnostic system in the musical instruments.

A typical example of the diagnostic system is disclosed in Japanese Patent No. 2830709. The prior art diagnostic computer program runs on the microprocessor, and checks the tone generator only for the parameters. In detail, if a user mistakenly sets parameters to forbidden values, the prior art electronic keyboard does not produce certain electronic tones. However, the user usually does not notify the forbidden values mistakenly set into the electronic keyboard. The prior art diagnostic system checks the parameters to see whether or not the forbidden values are found. When the prior art diagnostic system find the forbidden values, the prior art diagnostic system draws the user's attention to the parameters, and prompts the user to correct the parameters.

Another example of the prior art diagnostic system checks the electronic system for a failure in the electronic system. An automatic player piano is the combination of an acoustic piano and an electronic system, and the prior art diagnostic system checks the electronic system to see whether or not the black and white keys are driven for an automatic playing. However, the prior art diagnostic system can not specify the origin of the failure.

In more detail, the electronic system includes an information processing unit, sensor units and solenoid-operated key actuator units. Although the information processing unit is shared among the black and white keys, the black and white keys are respectively monitored with the sensor units, and are driven to actuate the associated action units by means of the solenoid-operated key actuator units, respectively. In other words, each sensor unit, each solenoid-operated key actuator and information processing unit form a control loop together with signal lines, and each of the black and white keys is controlled through the associated loop for driving the hammer. The prior art diagnostic system can diagnose each control loop as malfunction or not.

A certain control loop is assumed to be diagnosed as malfunction. The prior art diagnostic system informs the user of the failure of the control loop. However, the prior art diagnostic system does not point of the origin of failure. In other words, the prior art diagnostic system merely tells the user that the electronic system is troubled with something out of order. The user calls a service station, and tells a serviceman the diagnosis, i.e., the breakdown of the electronic system. The serviceman visits the user's home, and sequentially checks the sensor unit, solenoid-operated actuator, other electronic system components and signal lines to see whether or not the origin of failure is found therein. Namely, the serviceman traces the origin of failure. Thus, the diagnosis is less informative. This is the problem inherent in the prior art diagnostic system.

The applicant searched the prior art database for another related art, and found U.S. Pat. No. 5,908,997. An electronic keyboard equipped with an electronic tone generator is disclosed in the U.S. Patent. The numerals put in brackets are indicative of the references used in the U.S. Patent. Following features are read in the U.S. Patent. A debugging test is carried out for the MIDI co-processor (94) by means of the BIOS. The MIDI co-processor (94) has a built-in serial port (164), and the built-in serial port (164) is used in manufacturing quality assurance testing to verify the workings of the entire assembly. Remote diagnostics, which include software updates and repairs, can be run from a central off-sight facility through the model (70) to aid in troubleshooting. This is because of the fact that the diagnostics are stored in the MIDI co-processor local memory (170). However, the diagnostic method is not detailed in the U.S. Patent.

SUMMARY OF THE INVENTION

It is therefore an important object of the present invention to provide a musical instrument, an electronic system of which makes an origin of failure narrowed to a system component through a self-diagnosis.

It is also an important object of the present invention to provide a self-diagnostic system, which is incorporated in the electronic system of the musical instrument.

To accomplish the object, the present invention proposes to diagnose some component parts of a musical instrument on the basis of the outputs of system components of an electronic system.

In accordance with one aspect of the present invention, there is provided a musical instrument for producing tones comprising mechanical components selectively linked with one another and responsive to fingering thereon for producing tones, electric components associated with selected ones of the mechanical components and participating in the production of the tones, and a self-diagnostic system connected to the electric components for acquiring pieces of status data representative of current status of selected ones of the electric components and current status of the selected ones of the mechanical components and examining the pieces of status data to see whether or not the selected ones of the electric components, the selected ones of the mechanical components and other mechanical components related to the selected ones of the mechanical components are functional.

In accordance with another aspect of the present invention, there is provided a self-diagnostic system built in a musical instrument including mechanical components for producing tones and electric components associated with selected ones of the mechanical components and participating in the production of the tones, and the self-diagnostic system comprises a first diagnostician putting the electric components to an individual test and individually analyzing results of the individual test to see whether or not the electric components and the selected ones of the mechanical components are functional for diagnosing the electric components and the selected ones of the mechanical components and a second diagnostician obtaining the results of the individual test, and comprehensively analyzing the results of the individual test to see whether or not other mechanical components linked with the selected ones of the mechanical components are functional.

It is yet another important object of the present invention to provide a method for diagnosing a hybrid musical instrument including an acoustic musical instrument and an electronic system comprising the steps of a) individually energizing electric component parts of the electronic system to see whether or not the electric component parts are functional, and b) concurrently energizing the electric component parts of the electronic system to see whether or not mechanical component parts of the acoustic musical instrument associated with the electric component parts are functional.

BRIEF DESCRIPTION OF THE DRAWINGS

The features and advantages of the musical instrument and self-diagnostic system will be more clearly understood from the following description taken in conjunction with the accompanying drawings, in which.

DESCRIPTION OF THE PREFERRED EMBODIMENTS

In the following description, term "front" is indicative of a relative position closer to a player, who is sitting on a stool for fingering on a musical instrument, than another relative position modified with term "rear". Term "longitudinal" is indicative of a direction of a line drawn between a front position and a corresponding rear position. "Lateral direction" crosses the longitudinal direction at right angle.

Hybrid Musical Instrument

Figure 1:
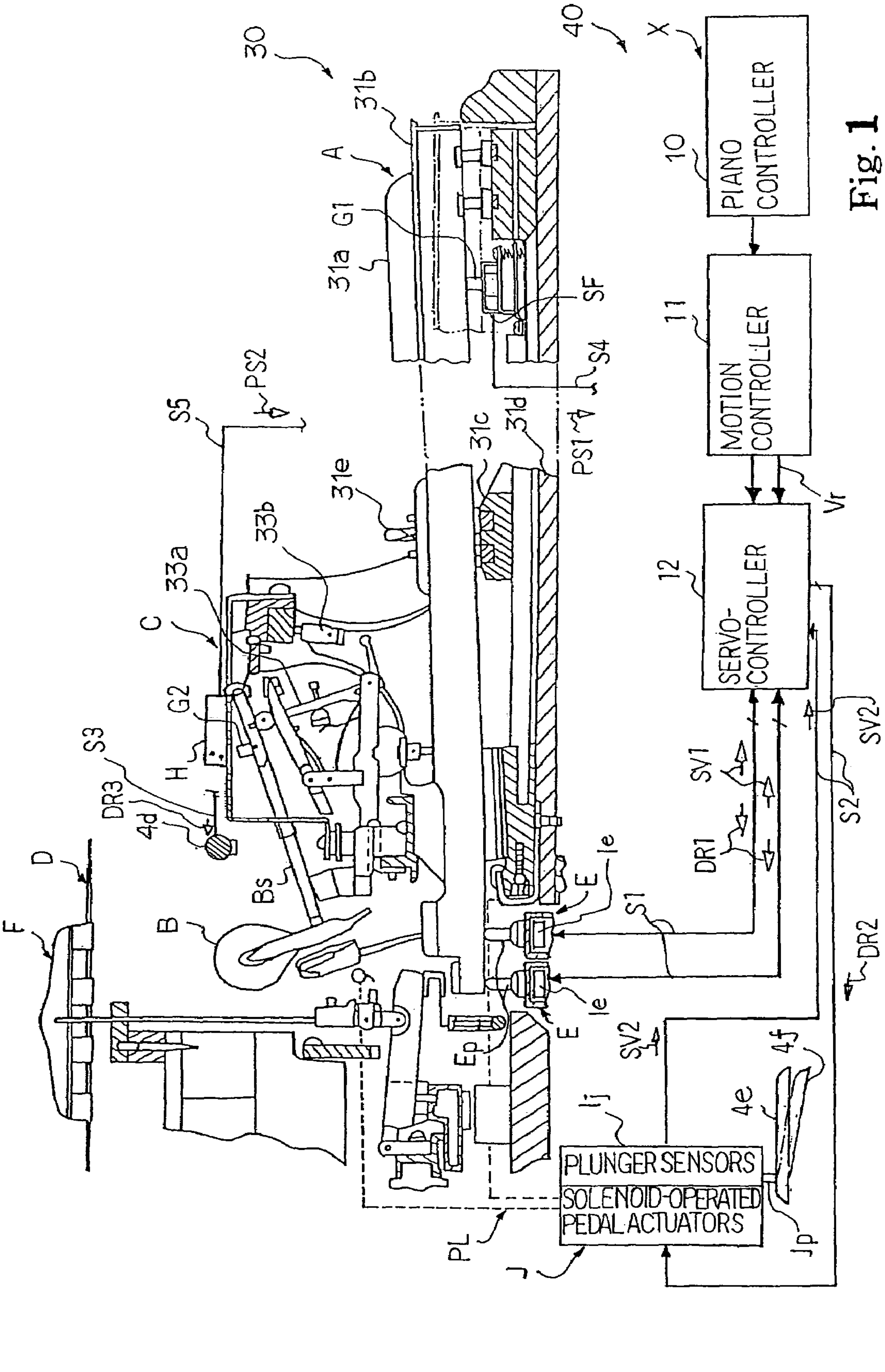
FIG. 1 is a side view showing the structure of a hybrid musical instrument according to the present invention.

Referring first to FIG. 1 of the drawings, a hybrid musical instrument embodying the present invention largely comprises an acoustic piano 30 and an electronic system 40. The electronic system 40 is installed in the acoustic piano 30, and is responsive to user's instructions so as selectively to achieve tasks.

While a human player is performing a piece of music on the acoustic piano 30, acoustic piano tones are produced through the acoustic piano 30 along the music passage. On the other hand, the electronic system 40 accomplishes a mute performance, a recording, an automatic playing and a self-diagnosis depending upon user's instruction.

A user is assumed to give instruction for the mute performance to the electronic system 40. The electronic system 40 stops the acoustic piano 30 from generating the acoustic tones, and produces electronic tones in response to the fingering on the acoustic piano 30. If the user instructs the electronic system 40 to record his or her performance, the electronic system produces pieces of music data representative of the performance on the acoustic piano 30, and encodes the pieces of music data to music data codes in predetermined formats. The predetermined formats may be defined in the MIDI (Musical Instrument Digital Interface) protocols.

When the user wishes to reproduce a piece of music through the automatic playing, the electronic system 40 cooperates with the acoustic piano 30 for producing the acoustic tones without any fingering of human player. Upon acknowledgement of the user's instruction, a set of music data codes is loaded to the electronic system 40, and the music data codes are sequentially analyzed for the automatic playing. The music data codes are representative of the acoustic tones to be produced through the acoustic piano 30 so that the electronic system 40 actuates the acoustic piano 30 at the time to produce each acoustic tone. Thus, the electronic system 40 plays the piece of music on the basis of the set of music data codes through the acoustic piano 30.

When the self-diagnosis is requested, a self-diagnostic subroutine program runs, and communication among system components, individual system components and cooperation among selected system components are diagnosed through the execution of the self-diagnostic subroutine program. Thus, the electronic system checks itself to see where an origin of failure is, if any. The self-diagnostic subroutine program will be hereinlater described in detail.

Structure of Acoustic Piano

The acoustic piano 30 comprises a keyboard A, hammers B, action units C, strings D and dampers F. The keyboard A is linked with the action units C and dampers F, and selectively actuates the action units C and dampers F. The keyboard A causes the dampers F to be spaced from the strings D, and give rise to rotation of the associated hammers B through the action units C. The strings D are struck with the hammers B, and the strings D vibrate for generating the acoustic tones.

Black keys 31*a* and white keys 31*b* are incorporated in the keyboard A, and extend in the longitudinal direction. The black keys 31*a* and white keys 31*b* are laid on the well-known pattern, and a balance rail 31*c*, which laterally extends, gives fulcrums to the black keys 31*a* and white keys 31*b* over a key bed 31*d*. The key bed 31*d* forms a part of a piano cabinet, and the black keys 31*a* and white keys 31*b* independently pitch up and down. Since the action units C exert the weight on the rear portions of the black and white keys 31*a*/31*b*, the black and white keys 31*a*/31*b* stay at respective rest positions as indicated by the real lines. While force is exerting on the black and white keys 31*a*/31*b* against the weight, the black and white keys 31*a*/31*b* travel from the rest positions to end positions, which are indicated by dot-and-dash lines in FIG. 1.

The action units C have respective jacks 33*a* and respective regulating buttons 33*b*. While the action units C are rotating in the counter clockwise direction in FIG. 1, the jacks 33*a* are brought into contact with the associated regulating buttons 33*b*, and escape from the hammers B. When the jacks 33*a* escape from the hammers B, the jacks 33*a* exert force on the hammers B, and give rise to the free rotation.

The black keys 31*a* and white keys 31*b* are further linked with the dampers F, and upwardly push the dampers F on the way to the end positions. Then, the dampers F start leaving the strings D, and permit the strings D to vibrate. Thus, the strings D gets ready to vibrate when the dampers F are spaced from the strings D.

The acoustic piano 30 further comprises a soft pedal 4*e*, a damper pedal 4*f* and link works PL connected between the pedals 4*e*/4*f* and the keyboard/dampers A/F. When the damper pedal 4*f* is depressed, the associated link work PL keeps the dampers F spaced from the strings D so that the strings D continuously vibrate after the release of the depressed keys 31*a*/31*b*. On the other hand, when the soft pedal 4*e* id depressed, the associated link work PL makes the hammers B offset from the associated strings D so that the loudness is reduced.

As will be understood from the foregoing description, the acoustic piano 30 is similar in structure to a standard grand piano, and a human pianist plays a piece of music on the acoustic piano 30 as similar to those who play pieces of music on the standard grand piano.

Electronic System

The electronic system comprises solenoid-operated key actuators E, solenoid-operated pedal actuators J, a mute unit 4*d*, key sensors SF, hammer sensors H, plunger sensors Ie and Ij and a control unit X. The solenoid-operated key actuators/plunger sensors SF/Ie, solenoid-operated pedal actuators J/plunger sensors Ij, mute unit 4*d*, key sensors SF and hammer sensors H are connected through signal cables S1, S2, S3, S4 and S5 to the control unit X, and driving signals DR1, DR2, plunger position signals SV1/SV2, a driving signal DR3, key position signals PS1 and hammer position signal PS2 are propagated through the signal cables S1, S2, S3, S4 and S5.

The solenoid-operated key actuators E and solenoid-operated pedal actuators J are respectively provided for the black and white keys 31*a*/31*b* and the soft and damper pedals 4*e*/4*f*, and the control unit X is connected in parallel to the solenoid-operated key actuators E and solenoid-operated pedal actuators J through the signal cables S1 and S2. The solenoid-operated key actuators E and solenoid-operated pedal actuators J have respective plungers Ep and Jp, and the plunger sensors Ie and Ij monitor the plungers Ep and Jp. The plunger sensors Ie and Ij are built in the solenoid-operated key actuators SF and solenoid-operated pedal actuators J, respectively, and supply plunger position signals SV1 and SV2, which express current plunger positions, to the control unit X through the signal cables S1/S2 for the servo-control. Thus, the control unit X, solenoid-operated key actuators E solenoid-operated pedal actuators J, plunger sensors Ie/Ij and signal cables S1/S2 form in combination servo-control loops for the black/white keys 31*a*/31*b* and soft/damper pedals 4*e*/4*f*.

In this instance, the solenoid-operated key actuators E with the built-in plunger sensors Ie are provided in a slot formed in the key bed 31*d*, and the plungers Ep are upwardly projectable from and downwardly retractable into associated solenoids so as to give rise to the key motion without the fingering of a human player.

The key sensors SF are provided under the front portions of the black/white keys 31*a*/31*b*, and the hammer sensors H are maintained over hammer shanks Bs of the hammers B. Optical modulators G1 and G2 are attached to the lower surfaces of the black/white keys 31*a*/31*b* and upper surfaces of the hammer shanks Bs, and the key sensors SF and hammer sensors H radiate light beams across the trajectories of the optical modulators G1/G2.

While the black and white keys 31*a*/31*b* are traveling between the rest positions and the end positions, the optical modulators G1 are moved along the trajectories, and make the amount of light varied. The amount of light is varied depending upon the current key positions, and the key position signals are produced from the modulated light beam. Thus, the key position signals PS1 are indicative of the current key positions of the associated black and white keys 31*a*/31*b*.

Similarly, while the hammers B are rotating toward the strings D, the optical modulators G2 are moved along the trajectories, and make the amount of light varied. The amount of light is varied depending upon the current hammer positions, and the hammer position signals PS2 are produced from the modulated light beam.

The mute unit 4*d* includes a hammer stopper and a motor. The hammer stopper laterally extends over the hammer shanks Bs, and the motor is energized with the driving signal DR3 so as to change the hammer stopper between a free position and a blocking position. While the hammer stopper is staying at the free position in the recording or automatic playing, the hammer stopper is out of the trajectories of the hammer shanks Bs so that the hammers B are brought into collision with the strings D. As a result, the hammers B give rise to the vibrations of strings D, and the acoustic tones are produced.

On the other hand, when the user wishes a mute performance, the hammer stopper is changed to the blocking position, and the hammer stopper enters the trajectories of all the hammer shanks Bs. Although the user selectively depresses the black/white keys 31*a*/31*b* in the mute performance, the hammers B rebound on the hammer stopper before striking the strings D, and the strings do not vibrate. Instead, the electronic system 40 produces the electronic tones corresponding to the acoustic tones to be produced. The user hears the electronic tones through a headphone so that the user does not disturb the neighborhood.

Figure 2:
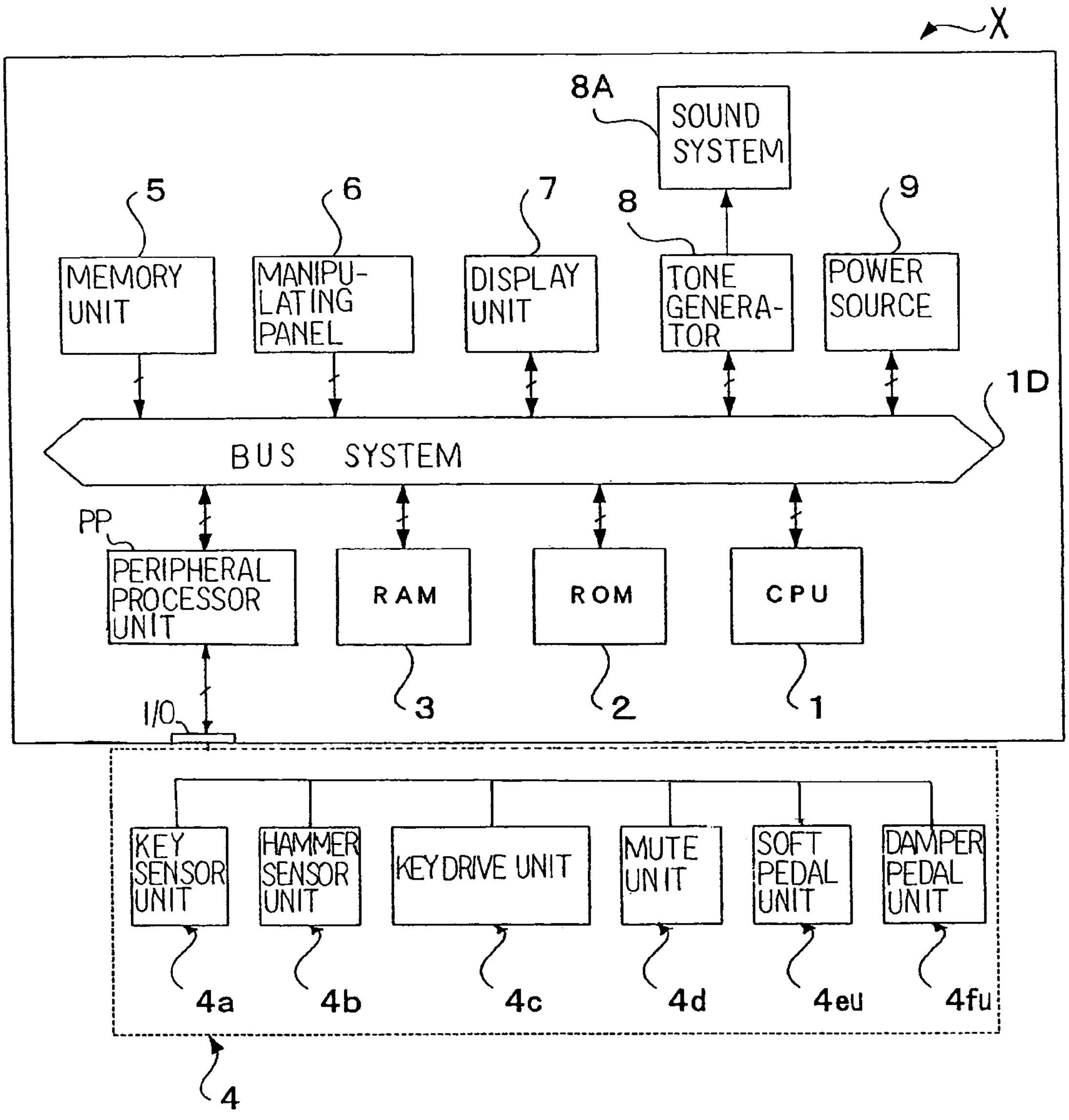
FIG. 2 is a block diagram showing the system configuration of a control unit.

FIG. 2 shows the system configuration of the control unit X. The key sensors/optical modulators SF/G1 and hammer sensors/optical modulators H/G2 form a key sensor unit 4*a* and a hammer sensor unit 4*b* together with a peripheral processor unit PP, respectively, and the solenoid-operated key actuators E serve as a key drive unit 4*c* also together with the peripheral processor PP unit. The peripheral processor unit PP, solenoid-operated pedal actuator J and plunger sensor Ij for the soft pedal 4*e* and the peripheral processor unit PP, solenoid-operated pedal actuator J and plunger sensor Ij for the damper pedal 4*f* as a whole constitute a soft pedal unit 4*eu* and a damper pedal unit 4*fu*, respectively. The concept of "mute unit" includes the data processing carried out by the peripheral processor unit PP on the mute unit 4*d*. These units 4*a*/4*b*/4*c*/4*eu*/4*fu* and mute unit 4*d* form an object 4.

The control unit X includes a microprocessor 1, which abbreviation "CPU" stands for, a program memory 2, which is implemented by a read-only memory abbreviated as "ROM", a working memory 3, which is implemented by a random access memory abbreviated as "RAM" and a bus system 1D. The bus system 1D has signal lines assigned to data signals, address signals and control signals, and the microprocessor 1, program memory 2 and working memory 3 are connected to the bus system 1D. A computer program is stored in the program memory 2, and a main routine program and subroutine programs constitute the computer program. Parameter tables and reference values, which are used in the diagnosis, are further stored in the program memory 2, and are accessed by the microprocessor 1 during execution of the computer program.

An electrically erasable and programmable memory may be used as the program memory 2. In this instance, the electronic system 40 easily copes with a version-up of the computer program especially the diagnostic subroutine program. The electrically erasable and programmable memory is further desirable for a reconstruction of the electronic system, because the diagnostic subroutine program is to be modified.

While the microprocessor 1 is reiterating the main routine program, user gives his or her instructions to the microprocessor 1, and acquires status information from the microprocessor 1. The microprocessor 1 accomplishes the jobs for the recording, mute performance, automatic playing and diagnosis to the object 4 through the execution of the subroutine programs. While the computer program is running on the microprocessor 1, the working memory 3 offers a temporary data storage to the microprocessor 1, and predetermined areas of the working memory 3 are assigned to registers, flags and tables. Thus, the subroutine program for the diagnosis forms the diagnostic system together with the microprocessor 1 and working memory 3.

When the user requests the automatic playing to the electronic system 40, the main routine program periodically branches to the subroutine program for the automatic playing, and a set of music data codes is transferred from an information medium such as, for example, a compact disk or a floppy disk to the working memory 3. Upon completion of the data transfer, the microprocessor 1 starts to process piece of music data expressed by the music data codes. The set of music data codes may be supplied through a private communication network or a public communication network to the control unit X, and is stored in the working memory 3.

The microprocessor 1 is assumed to fetch a music data code representative of a note-on event from the working memory 3. The microprocessor 1 firstly serves as a "piano controller 10" (see FIG. 1). The microprocessor 1 specifies the black or white key 31*a*/31*b* to be actuated, a time to generate the acoustic tone and the velocity equivalent to the loudness of the tone on the basis of the music data code, and determines a reference key velocity (t, Vr), i.e., target velocity (Vr) of the black or white key 31*a*/31*b* at a reference key point on a reference trajectory. If the black or white key 31*a*/31*b* is tracing the reference trajectory, the black or white key 31*a*/31*b* passes the reference key point at the reference key velocity (t, Vr), and the associated hammer B reaches the target velocity equivalent to the "velocity" immediately before the strike at the string D, and the vibrating string D generates the tone at the target loudness.

Subsequently, the microprocessor 1 serves as a "motion controller 11". The piano controller 10 supplies a piece of control data representative of the reference trajectory to the motion controller 11. Then, the motion controller 11 periodically checks an internal clock to see whether or not the time (t) comes. If the answer is given affirmative, the motion controller 11 outputs a piece of control data still representative of the target velocity (Vr).

Finally, the microprocessor 1 serves as a "servo-controller 12". The servo-controller 12 firstly converts the piece of control data representative of the target velocity (Vr) to a target amount of mean current or a target duty ratio of the driving signal DR1, and starts to supply the driving signal DR1 to the solenoid-operated key actuator E under the black or white keys 31*a*/31*b*. While the driving signal DR1 is flowing through the solenoid, the magnetic force is exerted on the plunger Ep, and the plunger Ep upwardly pushes the rear portion of the black or white key 31*a*/31*b*. The built-ion plunger sensor 1*e* determines the current plunger position, and informs the servo-controller 12 of the current plunger position through the plunger position signal SV1. The servo-controller 12 calculates the current plunger velocity, and compares the current plunger velocity with the target velocity Vr to see whether or not the plunger Ep and black or white key 31*a*/31*b* exactly traces the reference trajectory. If the answer is given affirmative, the servo-controller 12 keeps the driving signal DR1 at the target mean current. If, on the other hand, the answer is give negative, the servo-controller 12 regulates the driving signal to a proper amount of mean current.

The control unit X further includes a memory unit 5, a manipulating panel 6, a display unit 7, a tone generator 8, a sound system 8A, a power source 9 and an interface I/O. The peripheral processor PP forms a part of the control unit X. The memory unit 5, manipulating panel 6, display unit 7, tone generator 8 and power source 9 are also connected to the bus system 1D, and accomplish given tasks under the control of the microprocessor 1.

The memory unit 5 is non-volatile, and has a large data holding capacity.

In this instance, a hard disk driver serves as the memory unit 5. An FD (Flexible Disk) driver, a CD (Compact Disk) driver, an MO (Magneto-Optical) disk driver, a DVD (Digital Versatile Disk) driver and a memory board are available for the large-capacity data storage.

The manipulating panel 6 includes button switches, manipulating levers and indicators, and users communicate with the microprocessor 1 through these switches, sliders, wheels and indicators. One of the button switches is assigned to the self-diagnosis. When the user instructs the microprocessor 1 to carry out the self-diagnosis, he or she pushes the button switch. Then, the main routine program branches to the diagnostic subroutine program. Upon entry into the self-diagnosis, the microprocessor 1 prompts the user to select a test pattern. The user selectively pushes the switches assigned to the test patterns. Other button switches and levers are assigned to the tone color, volume and effects to be imparted to the electronic tones. For example, when user wishes to impart the pitch bend to an electronic tone, he or she manipulates the pitch bend wheel.

The display unit 7 is, by way of example, implemented by an LCD (Liquid Crystal Display) panel. The microprocessor 1 supplies pieces of video data through the bus system 1D to the display unit 7, and images, which represent messages to the user, current status of the electronic system 40, acknowledged instructions, lapse of time and diagnosis, are produced on the display unit 7.

The tone generator 8 includes a waveform memory and plural read-out circuits, and is connected to a sound system 8A. The tone generator 8 may be a software implementation or a hardware implementation. In case of the software implementation, the microprocessor 1 is available for the tone generator 8. In this instance, pieces of waveform data are stored in the form of pcm code. The microprocessor 1 timely supplies the music data codes representative of the note-on events and note-off events through the bus system 1D to the tone generator 8. The music data codes are selectively assigned to the read-out circuits, which stand idle, and the pieces of waveform data are sequentially read out from the waveform memory by means of the read-out circuits. The pieces of waveform data are converted to an analog audio signal, and the analog audio signal is supplied to the sound system 8A. The sound system 8A includes amplifiers, headphone and loud speakers so that the electronic tones are radiated from the loud speakers and/or headphone. Since the tone generator 8 can multiply establish channels for the pieces of waveform data, more than one electronic tone is produced from the sound system 8A. In this instance, the effectors are incorporated in the tone generator 8. However, the effectors may be provided between the tone generator 8 and the sound system 8A.

The power source 9 converts the electric power on the lamp wire to plural electric powers different in potential level from one another, and the electric powers are distributed in stable to the system components.

The interface I/O includes analog-to-digital converters, a pulse width modulator and a motor driver, and is connected to the key sensor unit 4*a*, hammer sensor unit 4*b*, key drive unit 4*c*, mute unit 4*d*, soft pedal unit 4*eu* and damper pedal unit 4*fu* through the analog-to-digital converters, pulse width modulator and motor driver. The peripheral processor unit PP is connected through an input-and-output bus system to the analog-to-digital converters and pulse width modulator, and is selectively communicable with them through the input-and-output bus system. The key sensors SF, hammer sensors H and plunger sensors Ie/Ij are connected to the analog-to-digital converters, and the pulse width modulator is connected to the solenoid-operated key actuators E and solenoid-operated pedal actuators J. The peripheral processor unit PP fetches the pieces of key position data, pieces of hammer position data and pieces of plunger position data from the analog-to-digital converters, and transfers the data codes expressing the positional data to the random access memory 3 through the bus system 1D. The driving signals DR1/DR2 are distributed to the solenoid-operated key actuators E and solenoid-operated pedal actuators J from the pulse width modulator. Only one peripheral processor or more than one peripheral processor is incorporated in the peripheral processor unit PP.

The electronic system 40 behaves in the recording and mute performance as follows. The user is assumed to instruct the electronic system 40 to record his or her performance on the acoustic piano 30 through the manipulating panel 6. The main routine program periodically branches to the subroutine program for the recording.

While the user is performing a piece of music on the acoustic piano 30, the key sensors E and hammer sensors H report the current key positions of the black and white keys 31*a*/31*b* and the current hammer positions of the hammers B to the interface I/O, and the peripheral processor unit PP periodically fetches the pieces of positional data from the interface I/O. The peripheral processor unit PP writes the pieces of key position data in a key table, the pieces of hammer position data in a hammer table and the pieces of pedal position data in a pedal table. The key table, hammer table and pedal table are prepared in certain areas of the working memory 3. Thus, a series of pieces of key position data is accumulated in the key table for each of the black and white keys 31*a*/31*b*, and a series of pieces of hammer position data is accumulated in the hammer table for each of the hammers B. The pieces of pedal position are indicative of the pedal stroke. The microprocessor 1 periodically analyzes the series of pieces of key position data, series of pieces of hammer position data and series of pieces of pedal position data as will be described hereinafter.

A series of key position data is assumed to indicate that the user depresses a certain black/white key 31*a*/31*b*. The microprocessor 1 specifies the key number assigned to the certain black/white key 31*a*/31*b*, and waits for the strike at the string D. When the string D is struck with the associated hammer B, the microprocessor 1 acknowledges the note-on event on the basis of the analysis on the series of pieces of hammer position data. Then, the microprocessor 1 calculates the hammer velocity immediately before the strike, and determines the time at which the string D is struck with the hammer B. The hammer velocity is proportional to the loudness of the acoustic piano tone, and the microprocessor 1 makes the hammer velocity corresponding to the velocity defined in the MIDI protocols. The time is indicative of the timing to produce the electronic tone or acoustic piano tone. The microprocessor 1 produces the music data code representative of the note-on event, and the key number, velocity and time are stored in the music data code.

A series of pieces of key position data is assumed to indicate that the user releases the depressed key 31*a*/31*b*. The microprocessor 1 acknowledges the note-off event, and specifies the key number of the released key 31*a*/31*b*. The microprocessor 1 analyzes the series of key position data, and determines the time at which the damper F is brought into contact with the vibrating string D. The microprocessor 1 produces the music data code representative of the note-off event, and stores the key number and time to decay the tone in the music data code.

When the user steps on the soft pedal 4*e* or damper pedal 4*fu*, the microprocessor 1 acknowledges a pedal event, and produces the music data code representative of the stroke of the soft pedal 4*eu* and the music data code representative of the stroke of the damper pedal 4*fu*. Thus, a set of music data codes expressing the performance is produced on the basis of the pieces of key position data, pieces of hammer position data and pieces of pedal position data during the performance on the acoustic piano 30.

The user is assumed to wish the mute performance. The user gives the instruction for the mute performance to the microprocessor 1 through the manipulating panel 6. The peripheral processor unit PP supplies the electric power to the motor of the mute unit 4*d* so as to change the hammer stopper to the blocking position. Upon entry into the blocking position, the microprocessor 1 permits the user to perform a piece of music on the acoustic piano 30 through a message produced on the display unit 7.

While the user is performing the piece of music on the acoustic piano 30, the microprocessor 1 produces the music data codes as described hereinbefore, and supplies the music data codes to the tone generator 8 through the bus system 1D. The tone generator 8 produces the audio signal from the pieces of waveform data on the basis of the music data codes, and the audio signal is supplied from the tone generator 8 to the sound system 8A. The audio signal is converted to the electronic tones through the headphone.

Diagnostic System

As described hereinbefore, the subroutine program for the self-diagnosis form the diagnostic system together with the microprocessor 1, peripheral processor unit PP and working memory 3. Plural tasks are accomplished through the execution of the subroutine program for the self-diagnosis with the assistance of the peripheral processor unit PP, and the structure of the tasks is a hierarchy as shown in FIG. 3.

Figure 3:
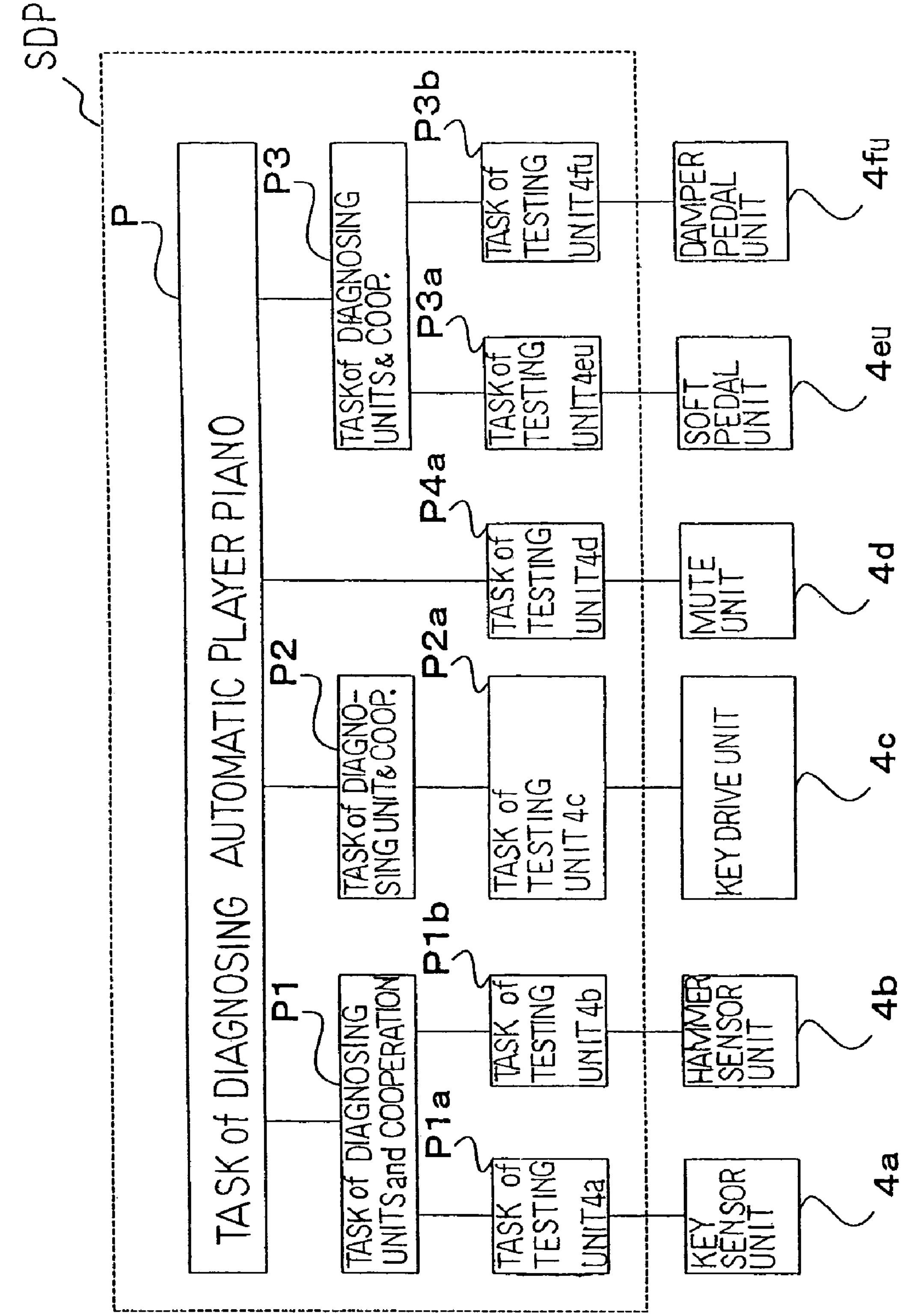
FIG. 3 is a block diagram showing the hierarchy of tasks accomplished through execution of a diagnostic subroutine program.

In FIG. 3, the subroutine program for the self-diagnosis is labeled with reference "SDP". The hierarchy is dependent on the object 4. If new units are added to the object 4, or if some units are eliminated from the object 4, new tasks are also added to or corresponding tasks are eliminated from the hierarchy, and, accordingly, the subroutine program SDP for the self-diagnosis is changed.

While the self-diagnosis subroutine program SDP is running on the microprocessor 1, the microprocessor 1 puts the individual units of the object 4, i.e., key sensor unit 4*a*, hammer sensor unit 4*b*, key drive unit 4*c*, mute unit 4*d*, soft pedal unit 4*eu* and damper pedal unit 4*fu* to the function test, and checks the results to see whether or not any unit 4*a*, 4*b*, 4*c*, 4*d*, 4*eu* or 4*fu* malfunctions. Even if any malfunction is not found in every unit 4*a*, 4*b*, 4*c*, 4*d*, 4*eu* or 4*fu*, it is not sure that the electronic system 40 can accomplish the recording, mute performance and automatic playing, because the units are to be correlated with one another through the mechanical component parts of the acoustic piano 30. For this reason, the microprocessor 1 diagnoses not only the individual units 4*a* to 4*fu* but also the correlation among the units 4*a* to 4*fu* through the execution of the subroutine program SDP.

The hierarchy shown in FIG. 3 has three strata, i.e., the lower stratum, middle stratum and higher stratum. The middle stratum and higher stratum obtain the results of the lower stratum and the results of the middle stratum, respectively, and carry out the own tasks on the basis of the results obtained therefrom.

The lower stratum includes a task P1*a* of testing the key sensor unit 4*a*, a task P1*b* of testing the hammer sensor unit 4*b*, a task P2*a* of testing the key drive unit 4*c*, a task P4*a* of testing the mute unit 4*d*, a task P3*a* of testing the soft pedal unit 4*eu* and a task P3*b* of testing the damper pedal unit 4*fu*. Upon completion of the testing, the units 4*a*, 4*b*, 4*c*, 4*d*, 4*eu* and 4*fu* are diagnosed on the basis of the results of tests. Thus, the tasks P1*a*, P1*b*, P2*a*, P4*a*, P3*a* and P3*b*, i.e., P1*a* to P3*b* of testing the individual units 4*a* to 4*fu* form the lower stratum.

The middle stratum includes three tasks of diagnosing the individual units 4*a* to 4*fu* and cooperation among the component parts of piano 30, and the microprocessor 1 checks the results of the tests at the tasks P1*a* to P3*b* to see whether the units 4*a* to 4*fu* function well or malfunction and to see whether or not the units 4*a* to 4*fu* are indicative of good cooperate among the related component parts. For example, the microprocessor 1 diagnoses the key sensor unit 4*a* and hammer sensor unit 4*b* in the task P1*a*, individually, and further makes a diagnosis on whether or not the pieces of key position data are well synchronized with the pieces of hammer position data in the same task P1*a*. Similarly, the microprocessor 1 diagnoses the function of soft pedal unit 4*eu* and the function of damper pedal unit 4*fu* on the basis of the results of test in the task P3, and further makes a decision on whether or not the soft pedal unit 4*eu* and damper pedal unit 4*fe* well cooperates with the other component parts in the same task P3.

The higher stratum includes a task of a diagnosis on the automatic player piano, and the microprocessor 1 checks the diagnoses obtained through the tasks P1 to P3 and P4*a* to see whether or not the units 4*a* to 4*fu* are indicative of good cooperation among the component parts of piano 30. The tasks P1, P2, P3 and P will be hereinafter described in more detail with reference to FIGS. 4, 5, 6, 7A, 7B and 8.

Figure 4:
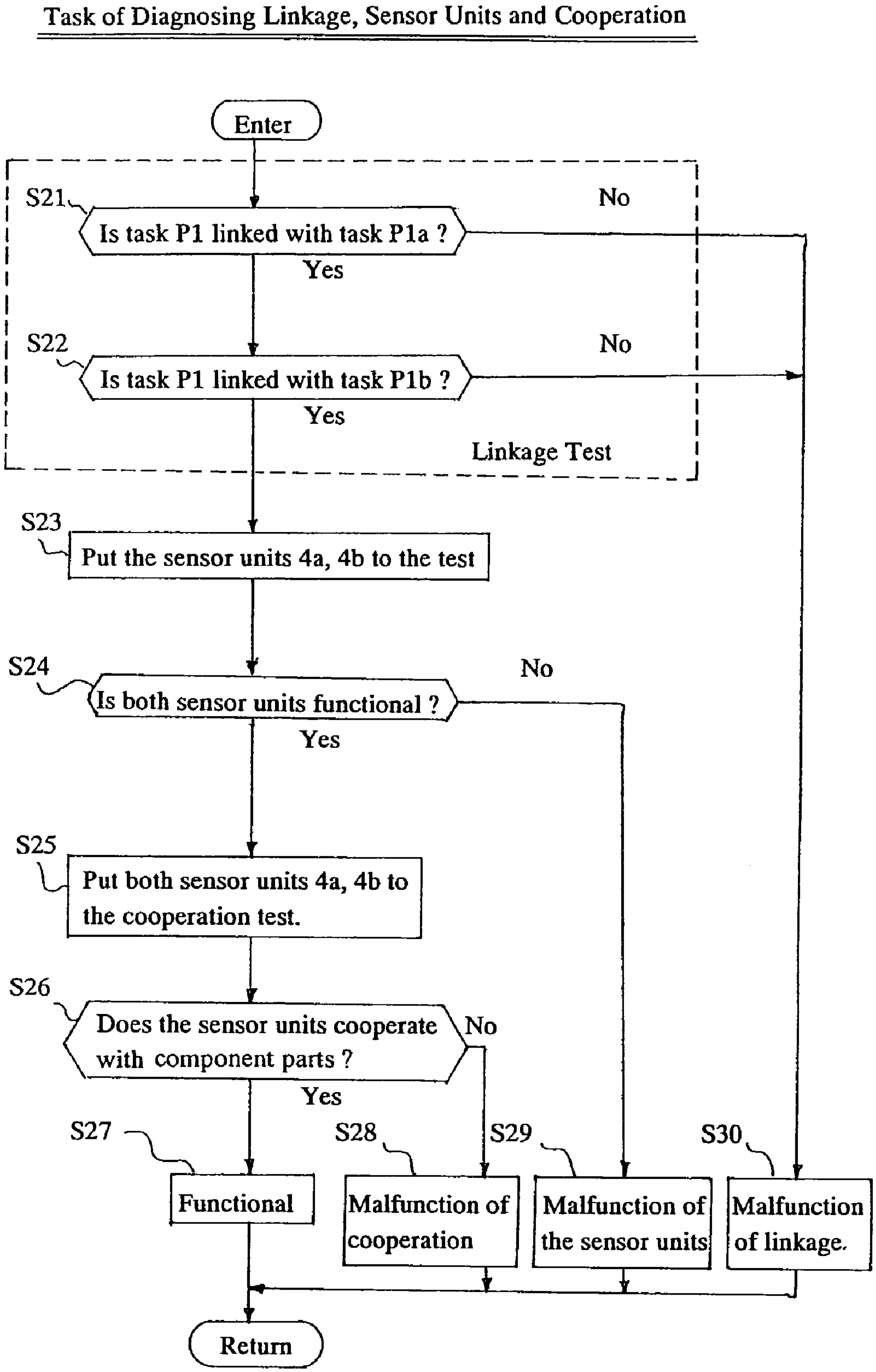
FIG. 4 is a flowchart showing a sequence of jobs for accomplishing a task of diagnosing sensor units.

FIG. 4 shows a flowchart showing a sequence of jobs for accomplishing the task P1 together with the tasks P1*a*/P1*b*. The microprocessor 1 accomplishes the task P1 as follows.

The computer program for the task P1 is assumed to start to run on the microprocessor 1. The microprocessor 1 firstly checks the bus system for the key sensors SF and hammer sensors H. First, the microprocessor 1 checks the bus system to see whether or not the task P1 will be properly linked with the task P1*a* as by step S21. In detail, the microprocessor 1 supplies a certain command through the shared bus system 1D to the peripheral processor unit PP, and the peripheral processor unit PP, with which the key sensors SF communicate, acknowledges the task for the data transfer to the microprocessor 1. If the microprocessor 1 receives the acknowledgement from the peripheral processor unit PP within a predetermined time period, the microprocessor 1 decides that the bus system is functional, and the answer at step S21 is given affirmative "Yes". With the positive answer "Yes", the microprocessor 1 proceeds to step S22.

However, if the microprocessor 1 does not receive any acknowledgement from the peripheral processor unit PP within the predetermined time period, the microprocessor 1 decides that the bus system malfunctions. In this situation, the microprocessor 1 can not acquire any result from the task P1*a*, and the microprocessor 1 decides the linkage between the task P1 and the task P1*a* to be improper. With the negative answer "No" at step S21, the microprocessor 1 proceeds to step S30, and stores the negative diagnosis of "malfunction of linkage" in the working memory 3.

In step S22, the microprocessor 1 checks the bus system to see whether or not the task P1 will be properly linked with the task P1*b*. In detail, the microprocessor 1 sends a command through the shared bus system 1D to the peripheral processor unit PP, with which the hammer sensors H communicate, and waits for the acknowledgement. When the acknowledgement reaches the microprocessor 1 within the predetermined time period, the microprocessor 1 decides that the bus system is functional, and the answer at step S22 is given affirmative "Yes". This means that the microprocessor 1 can fetch the results of the test in the task P1*b*, and the microprocessor 1 decides the linkage between the task P1 and the task P1*b* to be proper. With the positive answer "Yes", the microprocessor 1 proceeds to step S23.

If, on the other hand, the microprocessor 1 does not receive any acknowledgement within the predetermined time period, the microprocessor 1 decides that the bus system malfunctions, and the answer at step S22 is given negative "No". The microprocessor 1 diagnoses the linkage as "malfunction" at step S30, and stores the diagnosis in the working memory 3.

The answers at steps S21 and S22 are assumed to be affirmative. The microprocessor 1 puts the key sensor unit 4*a* and hammer sensor unit 4*b* to the individual test as by step S23, and accomplishes the tasks P1*a* and P1*b*. In the test, the microprocessor 1 requests the peripheral processor unit PP sequentially to supply the electric power from the power source 9 to the key sensors SF and hammer sensors H, and the peripheral processor unit PP transfers the pieces of key position data and pieces of hammer position data from the interface I/O to the working memory 3. The method for the individual test is well known to the skilled persons so that no further description is not incorporated for the sake of simplicity.

When the peripheral processing unit PP accomplishes the tasks P1*a* and P1*b*, the test results are accumulated in the random access memory 3. The microprocessor 1 checks the test results to see whether or not any one of the key and hammer sensors SF/H produced the key position signal/hammer position signals PS1/PS2 fallen within the predetermined potential range as by step S24. When the microprocessor 1 finds the test result indicative of the potential level out of the predetermined potential range, the answer at step S24 is given negative "No", and the microprocessor 1 diagnoses the key sensor unit 4*a* or hammer sensor unit 4*b* as the malfunction. The microprocessor 1 stores the diagnosis in the working memory 3 as by step S29.

If, on the other hand, all the pieces of key position data and all the hammer position data are fallen within the predetermined ranges, the microprocessor 1 decides that all the key and hammer sensors SF/H are functional, and the answer at step S24 is given affirmative "Yes".

Subsequently, the microprocessor 1 puts both key and hammer sensor units 4*a* and 4*b* to the cooperation test as by step S25. In the cooperation test, the microprocessor 1 requests the peripheral processor unit PP sequentially to supply the driving pulse signal DR1 from the pulse width modulator to the solenoid-operated key actuators E. The plungers Ep push the rear portions of the black and white keys 31*a*/31*b*, and the black and white keys 31*a*/31*b* give rise to the hammer motion through the action units C. The key sensors SF rep or the current key positions of the associated black and white keys 31*a*/31*b* to the peripheral processor unit PP through the key position signals PS1, and the hammer sensors H reports the current hammer positions of the associated hammers B to the peripheral processor unit PP through the hammer position signals PS2. The peripheral processor unit PP transfers the pieces of key position data and pieces of hammer position data to the working memory 3, and the pieces of key position data and pieces of hammer position data are accumulated in the working memory 3. The microprocessor 1 checks these pieces of position data to see whether or not the plunger motion properly results in the hammer motion as by step S26.

If the pieces of key position data and pieces of hammer position data are indicative of the proper transmission of motion from the black and white keys 31*a*/31*b* to the associated hammers B, the answer at step S26 is given affirmative "Yes", and the microprocessor 1 diagnoses the key sensor unit 4*e* and hammer sensor unit 4*f* as functional as by step S27. The microprocessor 1 writes the diagnosis in the working memory 3.

If, on the other hand, the force is not properly transmitted from the black/white key 31*a*/31*b* to the hammer position through the action unit C, the hammer position is not properly varied together with the key position, and the microprocessor 1 decides that the power transmission line is troubled with any one of the black/white key 31*a*/31*b*, action unit C and hammer B. The microprocessor 1 diagnoses the cooperation as the malfunction as by step S28, and stores the diagnosis in the working memory 3.

As will be understood from the foregoing description, the microprocessor 1 diagnoses the communication with the peripheral processor unit PP, i.e., the linkage of tasks P1 and P1*a*/P1*b*, functions of individual sensors SF/H and cooperation among the component parts of piano 30 as being function or malfunction during the execution of task P1.

Figure 5:
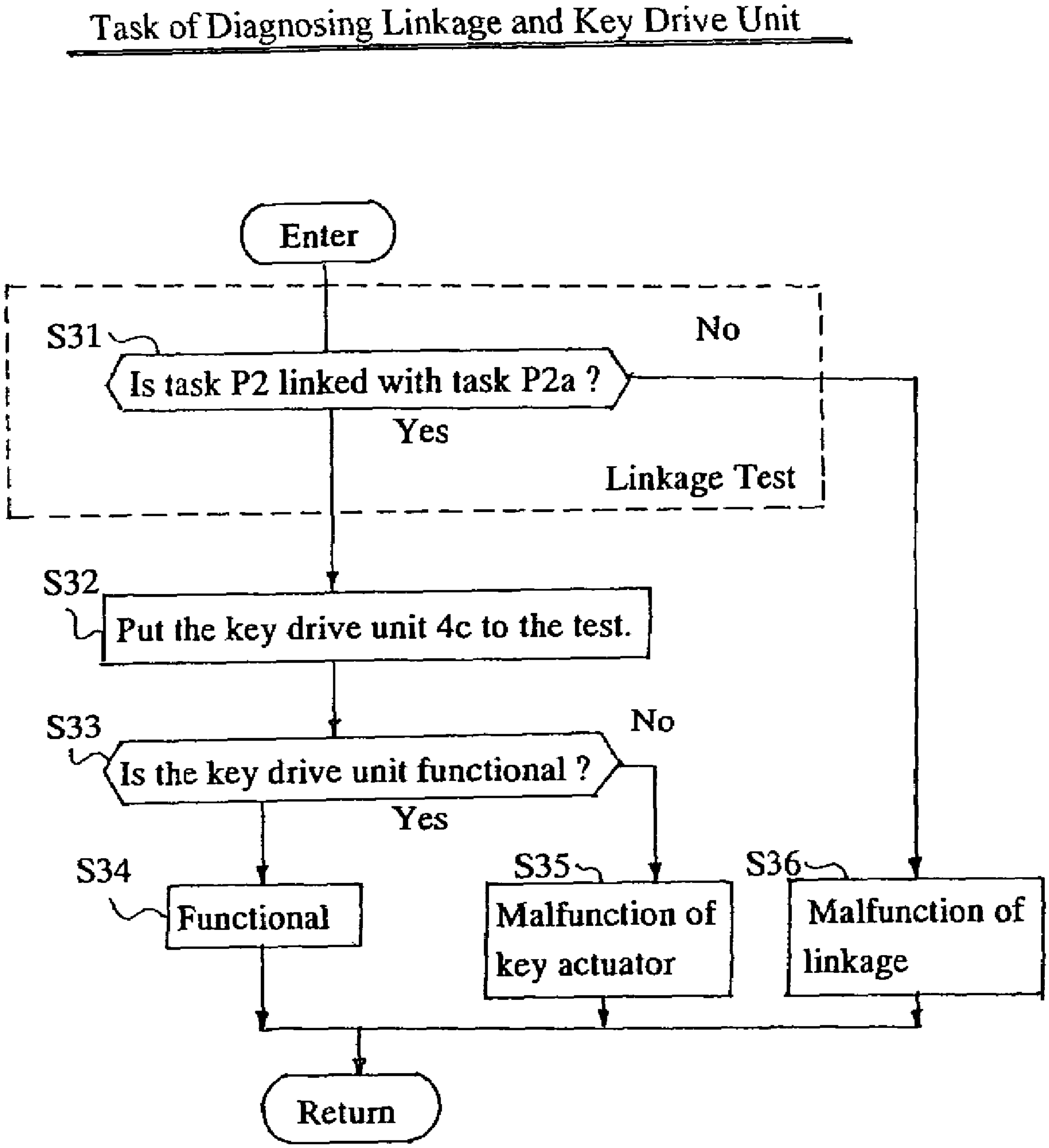
FIG. 5 is a flowchart showing a sequence of jobs for accomplishing a task of diagnosing a key drive unit.

FIG. 5 shows a flowchart showing a sequence of jobs for accomplishing the task P2 together with the task P2*a*. The microprocessor 1 accomplishes the task P2 as follows.

The computer program for the task P2 is assumed to start to run on the microprocessor 1. The microprocessor 1 checks the bus system for the solenoid-operated key actuators E. In other words, the microprocessor 1 checks the bus system to see whether or not the task P2 will be properly linked with the task P2*a*. In detail, the microprocessor 1 sends a command through the shared bus system 1D to the peripheral processor unit PP, and waits for the acknowledgement. If the peripheral processor unit PP sends the acknowledgement to the microprocessor 1 within a predetermined time period, the microprocessor 1 decides that the bus system is functional, and the answer at step S31 is given affirmative "Yes".

On the other hand, if any acknowledgement does not reach the microprocessor 1 within the predetermined time period, the microprocessor 1 decides that the bus system malfunctions, and the answer at step S31 is given negative "No". With the negative answer "No", microprocessor 1 proceeds to step S36, and diagnoses the communication through the sub system as "malfunction" at step S36. The microprocessor 1 stores the diagnosis of "malfunction" in the working memory 3, and returns to the subroutine program for the diagnosis.

The task P2 is assumed to be properly linked with the task P2*a*, i.e., the microprocessor 1 is communicable with the peripheral processor unit PP through the bus system. The microprocessor 1 puts the key drive unit 4*c* to the test in step S32. The microprocessor 1 requests the peripheral processor unit PP sequentially to supply the electric power from the power source 9 to the solenoid-operated key actuators E, and the plunger sensors Ij report the pieces of plunger data representative of the current plunger positions to the interface I/O. The plunger position signals SV1 are representative of the current plunger positions. The peripheral processor unit PP transfers the pieces of plunger data to the working memory 3, and the pieces of plunger data are stored in the working memory 3. The test is well known to the persons skilled in the art, and no further description is hereinafter incorporated for the sake of simplicity.

Subsequently, the microprocessor 1 checks the pieces of plunger data to see whether or not the solenoid-operated key actuators E exactly respond to the electric power as by step S33. If the pieces of plunger data are indicative of the plunger stroke corresponding to the electric power, the microprocessor 1 decides that the key drive unit 4*c* is functional as by step S34. The microprocessor 1 stores the positive diagnosis in the working memory 3.

If, on the other hand, any one of the plunger position signals SV1 is indicative of a current key position out of a proper range, the microprocessor 1 diagnoses the key drive unit 4*c* as malfunction in step S35, and stores the negative diagnosis in the working memory 3.

Upon completion of diagnosis in step 34, 35 or 36, the microprocessor 1 completes the task P2. The microprocessor 1 does not diagnose any cooperation, because the plunger sensors 1*e* are built in the solenoid-operated key actuators E.

Figure 6:
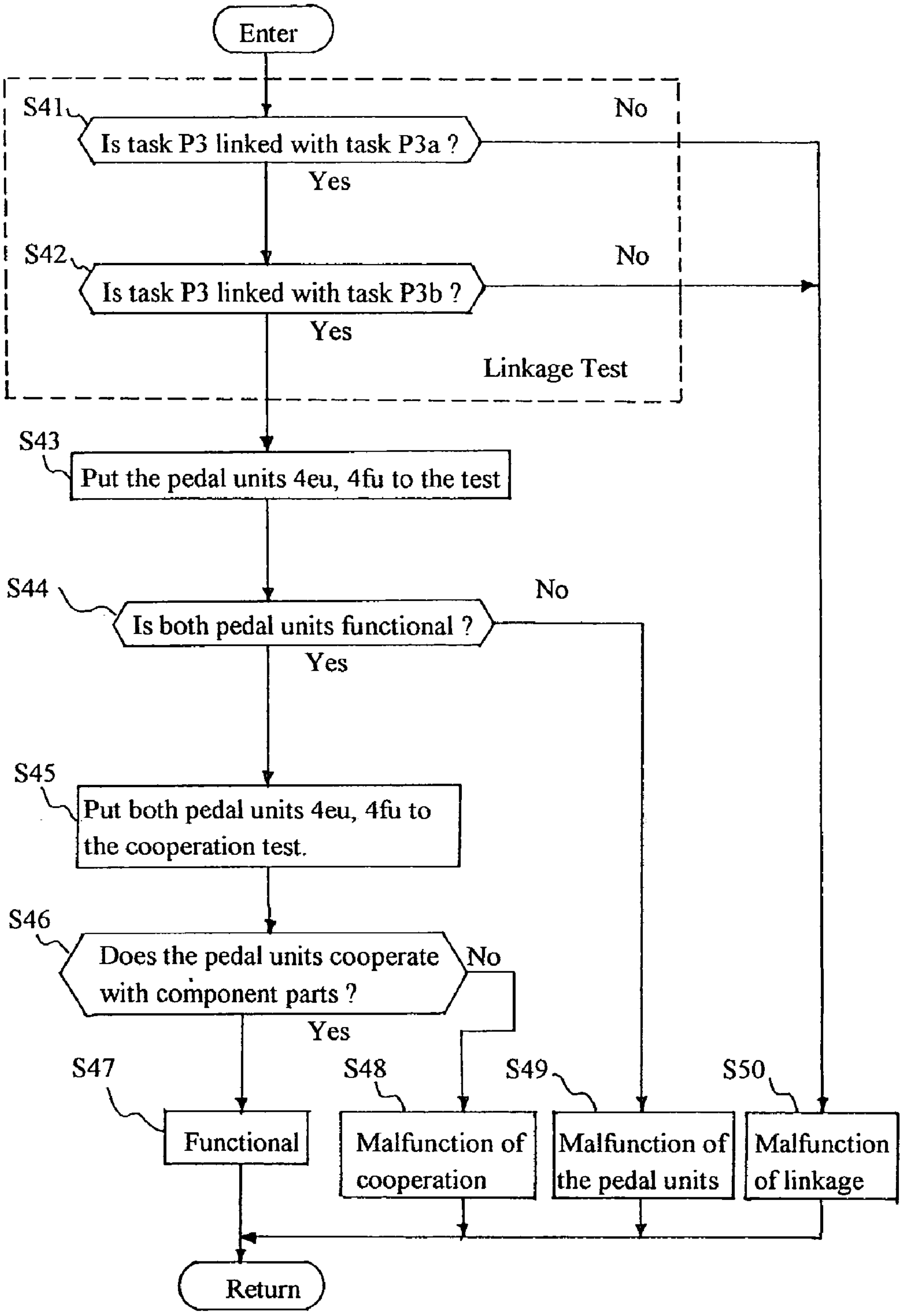
FIG. 6 is a flowchart showing a sequence of jobs for accomplishing a task of diagnosing pedal units.

FIG. 6 shows a flowchart showing a sequence of jobs for accomplishing the task P3 together with the tasks P3*a*/P3*b*. The microprocessor 1 accomplishes the task P3 as follows.

The computer program for the task P3 is assumed to start to run on the microprocessor 1. The microprocessor 1 firstly checks the communication through the bus system for the damper pedal unit 4*fu*. In detail, the microprocessor 1 sends a command to the peripheral processor unit PP through the shared bus system 1D, and waits for the acknowledgement to see whether or not the bus system is functional as by step S41. In other words, whether or not the task P3 will be properly linked with the task P3*a*. If the acknowledgement reaches the microprocessor 1 within a predetermined time period, the bus system is functional, and the answer at step S41 is given affirmative. With the positive answer "Yes", the microprocessor 1 proceeds to step S42. However, if the acknowledgement does not reach the microprocessor 1 within the predetermined time period, the microprocessor 1 will not acquire any result from the task P3*a*, and the microprocessor 1 decides that the bus system malfunctions, i.e., the linkage between the task P3 and the task P3*a* is improper. With the negative answer "No", the microprocessor 1 proceeds to step S50, and stores the negative diagnosis of "malfunction of linkage" in the working memory 3.

In step S42, the microprocessor 1 checks the communication through the bus system for the soft pedal unit 4*eu*. In detail, the microprocessor 1 sends a command to the peripheral processor unit PP through the shared bus system 1D, and checks the acknowledgement to see whether or not the bus system is functional as by step S42. In other words, whether or not the task P3 will be properly linked with the task P3*b*. If the acknowledgement reaches the microprocessor 1 within a predetermined time period, the microprocessor 1 decides that the bus system is functional, and the answer at step S41 is given affirmative. With the positive answer "Yes", the microprocessor 1 proceeds to step S43. However, if the acknowledgement does not reach the microprocessor 1 within the predetermined time period, the microprocessor 1 will not acquire any result from the task P3*b*, and the microprocessor 1 decides that the bus system malfunctions. In other words, the linkage between the task P3 and the task P3*b* is improper. With the negative answer "No", the microprocessor 1 proceeds to step S50, and stores the negative diagnosis of "malfunction of linkage" in the working memory 3.

The answers at steps S41 and S42 are assumed to be affirmative "Yes". The microprocessor 1 puts the soft pedal unit 4*eu* and damper pedal unit 4*fu* to the individual test as by step S43. The microprocessor 1 requests the peripheral processor unit PP sequentially to supply the driving signal DR2 from the pulse width modulator to the solenoid-operated pedal actuators J, and transfers the pieces of pedal data indicative of the current plunger positions to the working memory 3 so as to accumulate the pieces of pedal data in the working memory 3.

Upon completion of the individual test, the microprocessor 1 reads out the pieces of pedal data from the working memory PP, and checks the pieces of pedal data to see whether or not the solenoid-operated pedal actuators J are functional as by step S44. If the solenoid-operated pedal actuators J move the plungers Jp to respective target positions depending upon the duty ratio of the driving signal DR2, the answer at step S44 is given affirmative "Yes", and the microprocessor proceeds to step S45. On the other hand, if the solenoid-operated pedal actuator J keeps the plunger Jp unmoved, or if the solenoid-operated pedal actuator J varies the plunger position widely deviated from the target position, the microprocessor 1 decides that the solenoid-operated pedal actuator J malfunction as by step S49, and stores the negative diagnosis in the working memory 3.

In step S45, the microprocessor 1 puts the soft pedal unit 4*eu* and damper pedal unit 4*fu* to the cooperation test. The cooperation with the component parts of piano is examined. In case where an upright piano is used as the acoustic piano 30, it is easy to understand the cooperation test. When the microprocessor 1 requests the electric power source 9 to supply the electric power to the solenoid-operated pedal actuator J for the soft pedal 4*e*, the soft pedal 4*e* is pressed down, and a hammer rail pushes the hammers B rearwardly. The hammer motion is reported from the hammer sensors H to the interface I/O through the hammer position signals PS2, and the microprocessor 1 fetches the pieces of hammer data from the interface I/O. In case where damper sensors are provided for the dampers F, the damper pedal unit 4*fu* gives rise to the pedal motion, and the microprocessor 1 checks pieces of damper data, which are reported from the damper sensors, to see whether or not the dampers and link work between the damper pedal and the dampers are functional.

Subsequently, the microprocessor 1 checks the motion of component part or parts of the piano 30 to see whether or not both of the soft pedal unit 4*eu* and damper pedal unit 4*fu* well cooperate with the component parts of piano as by step S46. If the answer at step S46 is given affirmative "Yes", the microprocessor 1 diagnoses the soft pedal unit 4*eu* and damper pedal unit 4*fu* as functional as by step S47. If, on the other hand, the answer at step S46 is given negative "No", the microprocessor 1 diagnoses the soft pedal unit 4*eu* or damper pedal unit 4*fu* as malfunction as by step S48.

As will be understood from the description with reference to FIGS. 4, 5 and 6, the microprocessor 1 examines not only the units 4*a*, 4*b*, 4*c*, 4*eu* and 4*fu* but also the cooperation with the component parts of the piano 30 through the execution of the computer programs for the tasks P1, P2 and P3.

Figure 7A:
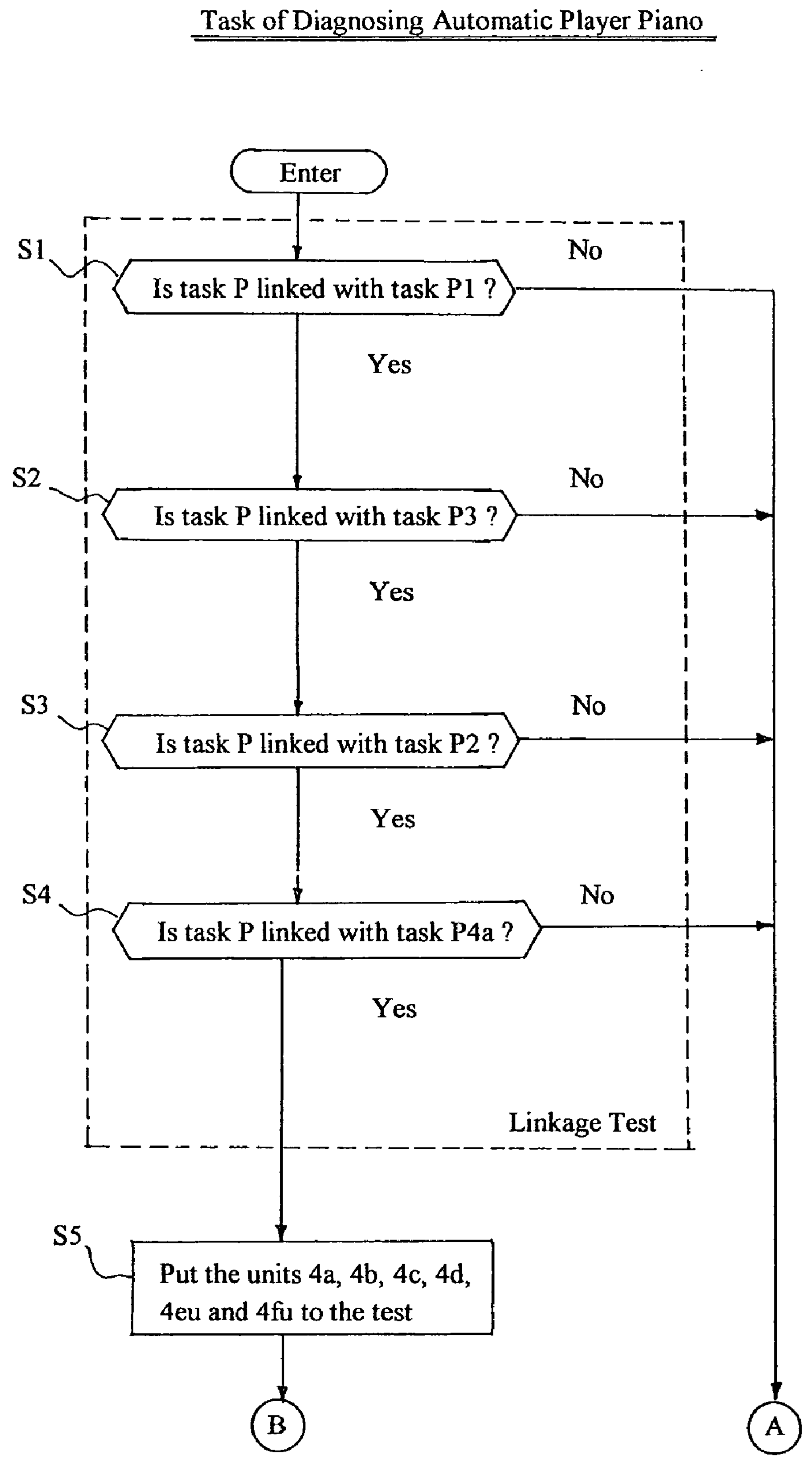
FIGS. 7A and 7B are flowcharts showing a sequence of jobs for accomplishing a task of diagnosing the automatic player piano.
Figure 7B:
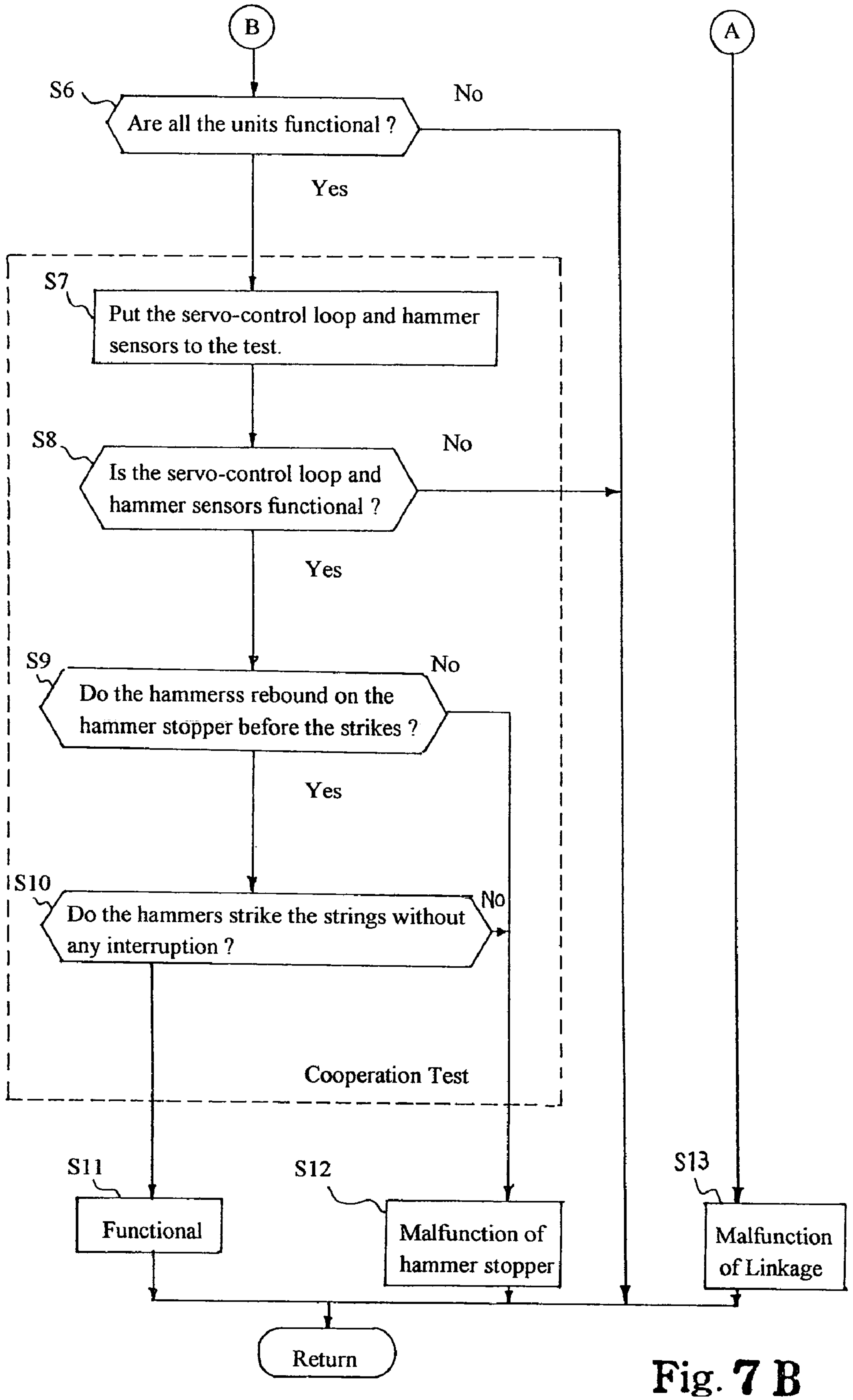

Description is hereinafter made on the computer program for the task P with reference to FIGS. 7A, 7B and 8. The tasks already described hereinbefore are incorporated in the task P. In other words, the computer program for the task P is synthetic.

The program for the task P is assumed to start to run on the microprocessor 1. The microprocessor 1 checks the communication through the bus system for the linkage to the task P1. In detail, the microprocessor 1 supplies a command to the peripheral processor unit PP through the shared bus system D1, and requests the peripheral processor unit PP to send the acknowledgement to see whether or not the task P will be properly linked with the task P1 as by step S1. If the acknowledgement reaches the microprocessor 1 within a predetermined time period, the answer is given negative "Yes", and the microprocessor 1 diagnoses that the task P1 will be properly linked with the task P. On the other hand, if the acknowledgement does not reach the microprocessor 1 within the predetermined time period, the microprocessor 1 diagnoses that the task P1 will be improperly linked with the task P as by step S13, and returns to the previous computer program.

At step S2, the microprocessor 1 further supply a command to the peripheral processor unit PP to see whether or not the task P will be properly linked with the task P3 as by step S2. If the acknowledgement does not reach the microprocessor 1 within a predetermined time period, the answer is given negative "No", and the microprocessor 1 also diagnoses that the task P3 will be improperly linked with the task P as by step S113.

When the acknowledgement reaches the microprocessor 1 within the predetermined time period, the answer is given affirmative "Yes", and the microprocessor 1 further send a command to the peripheral processor unit PP to see whether or not the task P will be properly linked with the task P2 as by step S3. If the acknowledgement does not reach the microprocessor 1 within a predetermined time period, the answer at step S3 is given negative "No", and the microprocessor 1 also diagnoses that the task P2 will not properly linked with the task P as by step S13.

When the acknowledgement reaches the microprocessor 1 within a predetermined time period, the answer is given affirmative "Yes", and the microprocessor 1 further sends a command to the peripheral processor unit PP to see whether or not the task P will be properly linked with the task P4*a* as by step S4. If the acknowledgement does not reach the microprocessor 1 within a predetermined time period, the answer is given negative "No", and the microprocessor 1 also diagnoses that the task P4*a* will not properly linked with the task P as by step S13.

When the acknowledgement reaches the microprocessor 1 within the predetermined time period, the answer is given affirmative "Yes", and the microprocessor 1 completes the linkage test.

Subsequently, the microprocessor 1 puts the key sensor unit 4*a*, hammer sensor unit 4*b*, key driver unit 4*c*, soft pedal unit 4*eu* and damper pedal unit 4*fu* to the individual tests as by step S5. The test has been already described with reference to FIGS. 4 to 6, and the description is not repeated for avoiding repetition.

The microprocessor checks the working memory 3 to see whether or not all of the key sensor, hammer sensor, key driver, soft pedal and damper pedal units 4*a*, 4*b*, 4*c*, 4*eu* and 4*fu* have been diagnosed as functional as by step S6. If the answer is given negative "No", the microprocessor 1 immediately returns to the previous computer program.

If, on the other hand, all of the units 4*a*, 4*b*, 4*c*, 4*eu* and 4*fu* are functional, the microprocessor 1 starts the cooperation test. First, the microprocessor 1 puts the servo-control loop 304 to the cooperation test as by step S7. The jobs at step S7 will be hereinlater described with reference to FIG. 8.

The microprocessor 1 checks the results to see whether or not the servo-control loop 304 and hammer sensors H are functional as by step S8. If any one of the component parts of the servo-control loop or hammer sensor H is diagnosed as malfunction, the answer at step S8 is given negative "No", and the microprocessor 1 immediately returns to the previous computer program.

The servo-control loop and hammer sensors H are assumed to be functional. With the positive answer "Yes", the microprocessor starts to examine the mute unit 4*d*. First, the microprocessor 1 requests the peripheral processor unit PP to supply the electric power from the driver circuit 9 to the electric motor of the hammer stopper 4*d*, and changes the hammer stopper 4*d* to the blocking position. Upon entry into the blocking position, the microprocessor 1 requests the peripheral processor unit PP sequentially to supply the driving signal DR1 from the pulse width modulator to the solenoid-operated key actuators E, and the peripheral processor unit PP transfers the pieces of hammer data, which are represented by the hammer position signals PS2 from the hammer sensors H, from the interface I/O to the working memory 3 so as to accumulate the pieces of hammer data. The microprocessor 1 checks the pieces of hammer data to see whether or not the hammers B rebound on the hammer stopper 4*d* before striking the strings D as by step S9. If any one of the strings D is struck with the hammer B, the answer at step S9 is given negative "No", and the microprocessor 1 diagnoses the mute unit or hammer stopper 4*d* as malfunction as by step S12.

If, on the other hand, the hammers B are properly rebound on the hammer stopper 4*d*, the answer at step S9 is given affirmative "Yes", and the microprocessor 1 proceeds to step S10. In step S10, the microprocessor 1 requests the peripheral processor unit PP to supply the driving signal DR1 from the driver circuit to the mute unit 4*d* so as to change the hammer stopper to the free position, and the peripheral processor unit PP accumulates the pieces of hammer data in the working memory 3. The microprocessor 1 checks the pieces of hammer data to see whether or not the strings D are struck with the hammers B. If any one of the hammers B does not reach the string D, the answer at step S10 is given negative "No", and the microprocessor 1 diagnoses the hammer stopper 4*d* as the malfunction at step S12.

All the strings D are struck with the associated hammers B. Then, the answer at step S10 is given affirmative "Yes", and the microprocessor 1 diagnoses the automatic player piano as functional as by step S11.

Figure 8:
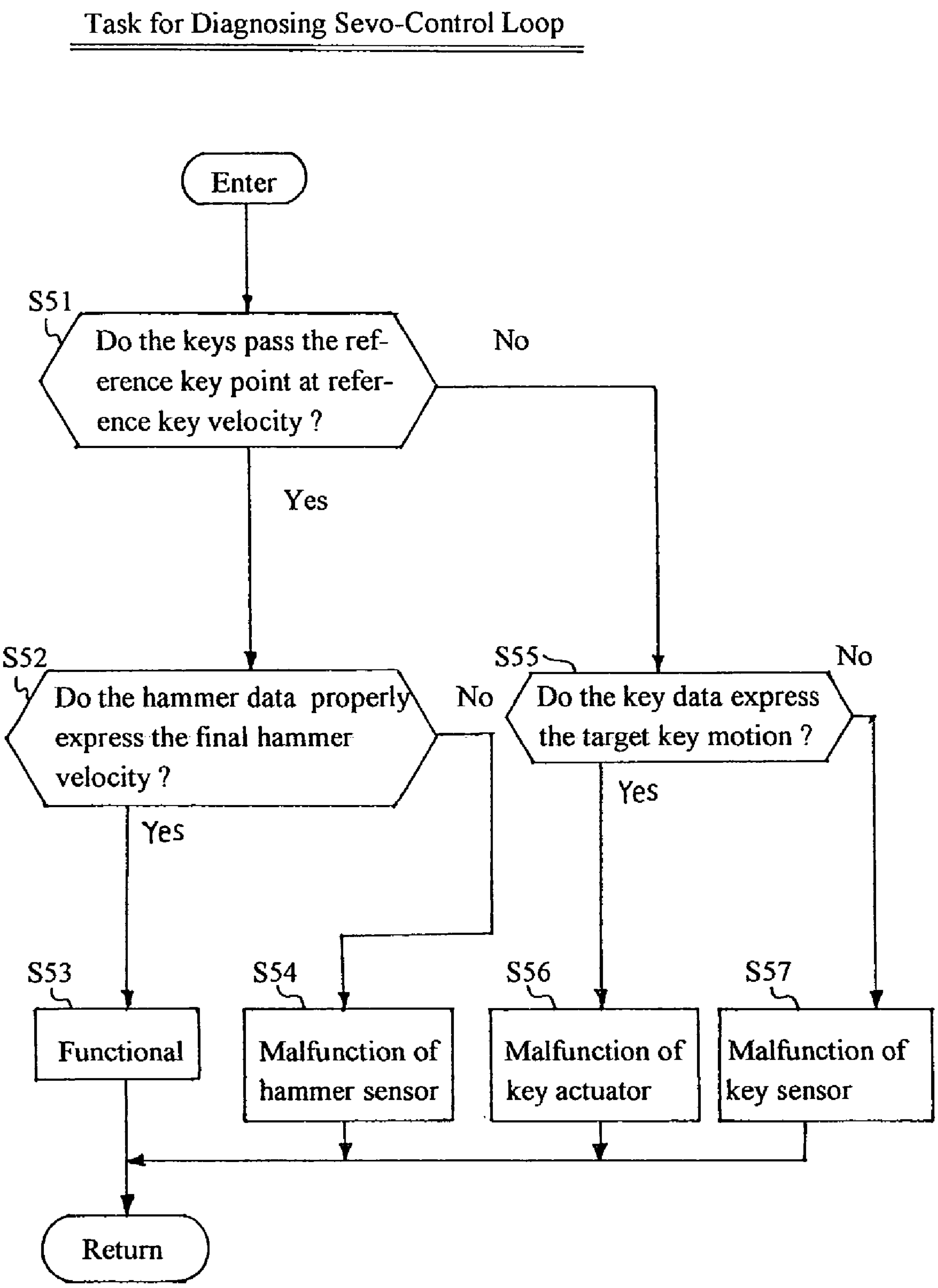
FIG. 8 is a flowchart showing a sequence of jobs for accomplishing a task for diagnosing a servo-control loop.

Turning to FIG. 8, the microprocessor 1 examines the servo-control loop to see whether or not the strings D are struck with the hammers B at target strength, and behaves at steps S7 and S8 as follows.

First, the microprocessor 1 determines the reference key velocity (t, Vr) as the job assigned to the motion controller 11, and supplies a target value of key velocity Vr to the solenoid-operated key actuators E as the function of the servo-controller 12. The black and white keys 31*a*/31*b* travel on the reference trajectories under the control of the servo-control loop, and pass the reference key points on the reference trajectories. The key sensors SF monitor the associated black and white keys 31*a*/31*b*, and supplies the pieces of key data to the microprocessor 1. The microprocessor 1 determines a measured value of reference key velocity on the basis of the pieces of key data, and compares the measured value of reference key velocity with the target value of reference key velocity to see whether or not the servo-control loop has made the black and white keys 31*a*/31*b* pass the reference key points at the target value of reference key velocity as by step S51.

When the microprocessor 1 finds the measured value of reference velocity approximately equal to the target value of reference velocity (t, Vr), the answer at step S51 is given affirmative "Yes", and the microprocessor 1 proceeds to step S52. Since the black and white keys 31*a*/31*b* pass the reference key points at the target value of reference key velocity, the hammers B are to be brought into collision with the strings D at a target value of hammer velocity which is corresponding to the "velocity" defined in the MIDI protocols. While the hammers B are traveling on their trajectories, the hammer sensors H supplies the hammer position signals PS2 to the interface I/O. The microprocessor 1 periodically fetches the pieces of hammer data representative of the current hammer positions, and determines the final hammer velocity on the basis of the pieces of hammer data. Then, the microprocessor 1 compares the measured value of the hammer velocity with the target value of hammer velocity corresponding to the target value of reference key velocity (t, Vr) to see whether or not the pieces of hammer data exactly express the current hammer positions in step S52.

If the answer is given negative "No", the microprocessor 1 diagnoses the hammer sensor H as malfunction as by step S54. However, if the answer is given affirmative "Yes", the microprocessor 1 diagnoses the automatic player piano as functional.

If, on the other hand, the answer at step S51 is given negative "No", the microprocessor 1 analyzes the pieces of key data to see whether or not the solenoid-operated key actuators E give rise to the target key motion as by step S55. If the actual key motion is close to the target key motion, the answer at step S55 is given affirmative "Yes", and the microprocessor 1 decides that the key sensors SF properly report the current key positions to the interface I/O. The microprocessor 1 diagnoses the solenoid-operated key actuators E as malfunction as by step S56. On the other hand, if the actual key motion is curious, the answer at step S55 is given negative "No", and the microprocessor 1 diagnoses the key sensors SF as malfunction as by step S57.

As will be appreciated from the foregoing description, the self-diagnosis system according to the present invention diagnoses not only the system components of electronic system but also the communication through the sub-system and cooperation with the component parts of piano. For this reason, the user can specify the origin of trouble with the assistance of the self-diagnosis system.

Moreover, the tasks P, P1 to P3 and P1*a* to P4*a* form the hierarchy so that the manufacturer easily expands the diagnostic system. Even if a new unit is added to or a certain unit is deleted from the electronic system, the manufacturer easily modifies the self-diagnostic system with corresponding tasks.

Although the particular embodiments of the present invention has been shown and described, it will be apparent to those skilled in the art that various changes and modifications may be made without departing from the spirit and scope of the present invention.

The computer program, tables and reference values may be stored in the memory unit 5. In this instance, the computer program, tables and reference values are transferred to the working memory 3 during the initialization of the electronic system 40, and this feature makes the version-up easy. The version-up may be required for a system change of the electronic system 40.

A CRT (Cathode Ray Tube) or another sort of display panel may serve as the display unit 7.

In order to produce the electronic tones, a frequency modulation system, a physical model system or a formant composing system may be employed in the tone generator 8.

The automatic player piano does not set any limit to the technical scope of the present invention. The present invention may be applied to an electronic musical instrument such as, for example, an electronic stringed musical instrument, an electronic wind instrument and an electronic percussion instrument and another sort of hybrid musical instrument such as, for example, a mute piano. Otherwise, the present invention may be applied to an electronic performance system, which includes electronic musical instruments and/or hybrid musical instruments connected through the MIDI interface or a public communication network. Thus, the self-diagnostic system according to the present invention appertains to any musical instrument and/or any musical instrument system.

If the acoustic piano is replaced with another musical instrument, the component parts are different from those of the acoustic piano, and, accordingly, sensors and actuators to be required for performance are probably different from those of the electronic system 40. This means that the hierarchy shown in FIG. 3 is a mere example of the self-diagnosis system according to the present invention.

The task for diagnosing the servo-control loop may be carried out in relation with the tasks P1 and P2.

The key sensors SF and hammer sensors H do not set any limit to the technical scope of the present invention. The dampers and/or key frame may be further monitored with damper sensors and/or a switch, and the signal lines may be connected at both ends thereof to a potentiometer through a multiplexer for diagnosing the signal cable.

The component parts of acoustic piano 30 and system components of electronic system 40 are correlated with claim languages as follows. The black and white keys 31*a*/31*b*, action units C, hammers B, strings D, dampers F, hammer stopper 4*d* and soft and damper pedals 4*e*/4*f* serve as "mechanical components", and the solenoid-operated key actuators E, built-in plunger sensors Ie, solenoid-operated pedal actuators J, built-in plunger sensors Ij, key sensors SF, hammer sensors H, electric motor connected to the hammer stopper 4*d* and signal lines S1/S2/S4/S5 are corresponding to "electric components". The control unit X and self-diagnostic subroutine program as a whole constitute a "self-diagnostic system". The black and white keys 31*a*/31*b* and hammers B are corresponding to "selected ones of said mechanical components", and the action units C serve as "other mechanical components". In case where the damper sensors are further incorporated in the electronic system 40, the dampers F and link works connected to the soft and damper pedals 4*e*/4*f* are further incorporated in the "other mechanical components". The acknowledgement is corresponding to one of the "answers".

The control unit X and computer programs for the jobs at steps S23, S24, S29, S32, S33, S35, S43, S44 and S49 as a whole constitute a "first diagnostician", and the control unit X and computer programs for the jobs at steps S9, S10, S25, S26, S45 and S46 as a whole constitute a "second diagnostician".

The control unit X and computer program for the jobs at steps S51, S 52, S53, S54, S55, S56 and S57 as a whole constitute a "third diagnostician".

The central processing unit 1, peripheral processing unit PP, bus system 1D and jobs at steps S1–S5, S21, S22, S31, S41, S42 as a whole constitute a "fourth diagnostician".

What is claimed is:

1. A musical instrument for producing tones, comprising: mechanical components, selected ones of which are linked with one another, and responsive to fingering by a player for producing tones;

electric components associated with selected ones of said mechanical components for participating in the production of said tones; and a self-diagnostic system connected to said electric components for acquiring pieces of status data representative of current status of selected ones of said electric components and current status of said selected ones of said mechanical components, and examining said pieces of status data to see whether or not said selected ones of said electric components, said selected ones of said mechanical components and other mechanical components related to said selected ones of said mechanical components are functional.

2. The musical instrument as set forth in claim 1, in which said self-diagnostic system gives rise to motion of said mechanical components through which said tones are produced, and comprehensively analyzes results of said motion to determine what is an origin of failure to be found in the group of said electric components.

3. The musical instrument as set forth in claim 1, in which said self-diagnostic system includes;

sensors monitoring particular mechanical components so as to produce detecting signals representative of particular pieces of said status data which said self-diagnostic system comprehensively analyzes to see whether or not said other mechanical components are functional, actuators responsive to driving signals so as to give rise to motion of other particular mechanical components; and other sensors monitoring movable parts of said actuators so as to produce other detecting signals representative of other particular pieces of said status data which said self-diagnostic system individually analyzes to determine whether said selected ones of said electric components and said selected ones of said mechanical components are functional.

4. The musical instrument as set forth in claim 3, in which said self-diagnostic system controls one of said driving signals so as to force selected ones of said particular mechanical components to pass reference points on reference trajectories thereof at target values of a reference velocity, and comprehensively analyzes selected ones of said particular pieces of said status data obtained around said reference points to see whether or not said sensors and said actuators are functional.

5. The musical instrument as set forth in claim 4, in which said reference velocity is proportionally varied together with loudness of said tones.

6. The musical instrument as set forth in claim 3, in which said self-diagnostic system further individually analyzes said particular pieces of said status data to see whether or not said sensors are functional.

7. The musical instrument as set forth in claim 1, in which at least keys, action units, hammers and strings of an acoustic piano serve as said mechanical component parts, and actuators for moving said keys, sensors for monitoring said keys and said hammers and other sensors for monitoring movable parts of said actuators are incorporated in the group of said electric components.

8. The musical instrument as set forth in claim 7, in which said sensors supply detecting signals representative of particular pieces of said status data which said self-diagnostic system comprehensively analyzes to see whether or not said action units are functional, and said other sensors supply other detecting signals representative of other particular pieces of said status data which said self-diagnostic system individually analyzes to see whether or not said actuators are functional.

9. The musical instrument as set forth in claim 8, in which said self-diagnostic system further individually analyzes said particular pieces of said status data to see whether or not said sensors are functional.

10. The musical instrument as set forth in claim 8, in which said self-diagnostic system supplies a driving signal to said actuators so as to force said keys to pass reference points on reference trajectories at target values of reference velocity, and comprehensively analyzes said particular pieces of said status data what is an origin of failure to be found in the group consisting of said sensors and said actuators.

11. The musical instrument as set forth in claim 8, in which pedals further serve as said mechanical components, and other actuators for moving said pedals and still other sensors for monitoring movable parts of said other actuators are further incorporated in said group of said electric components.

12. The musical instrument as set forth in claim 11, in which said still other sensors supply still other detecting signals representative of still other particular pieces of said status data which said self-diagnostic system individually analyzes to see whether or not said other actuators are functional.

13. The musical instrument as set forth in claim 8, in which a hammer stopper further serves as said mechanical components so as to permit said hammers to strike said strings and prohibit said strings from said hammers, and said self-diagnostic system further analyzes selected ones of said particular pieces of said status data to see whether or not said hammer stopper is functional.

14. The musical instrument as set forth in claim 1, in which said self-diagnostic system includes:

a central processing unit sequentially fetching programmed instructions for self-diagnosis, a peripheral processing unit connected to said electric components for acquiring pieces of status data, and a bus system connected to said central processing unit and said peripheral processing unit so as to propagating commands from said central processing unit and said peripheral processing unit and answers from said peripheral processing unit to said central processing unit, wherein said central processing unit diagnoses said bus system on the basis of said answers.

15. A self-diagnostic system built in a musical instrument including mechanical components for producing tones and electric components associated with selected ones of said mechanical components and participating in the production of said tones, comprising:

a first diagnostic device for putting selected ones of said electric components to an individual test, and individually analyzing results of said individual test to see whether or not said selected ones of said electric components and said selected ones of said mechanical components are functional; and a second diagnostic device for obtaining said results of said individual test and results of a cooperation test, and comprehensively analyzing said results of said individual test and said results of said cooperation test to see whether or not other mechanical components linked with said selected ones of said mechanical components are functional.

16. The self-diagnostic system as set forth in claim 15, further comprising a third diagnostic device giving rise to motion through which said tones are produced, and comprehensively analyzing results of said motion to see what is an origin of failure to be found in the group of said electric components.

17. The self-diagnostic system as set forth in claim 16, in which said third diagnostic device forms a hierarchy together with said first diagnostic device and said second diagnostic device.

18. The self-diagnostic system as set forth in claim 15, further comprising a fourth diagnostic device for supplying a command from a central processing unit to a peripheral processing unit through a bus system, receiving an answer from said peripheral processing unit to said central processing unit and diagnosing said bus system on the basis of said answer.

19. A method for diagnosing a hybrid musical instrument including an acoustic musical instrument and an electronic system, comprising the steps of:

a) energizing electric component parts of said electronic system to see whether or not said electric component parts are functional, and b) concurrently energizing said electric component parts of said electronic system to see whether or not mechanical component parts of said acoustic musical instrument associated with said electric component parts are functional.

20. The method as set forth in claim 19, in which said step a) includes the sub-steps of a-1) energizing selected ones of said electric components parts to see whether or not signal paths therebetween are functional, and a-2) energizing others of said electric component parts to see whether or not said other electric component parts are individually functional.

* * * * *